United States Patent

Vannest

[15] 3,675,292
[45] July 11, 1972

[54] METHOD FOR MAKING A ROLLER BEARING RETAINER

[72] Inventor: James L. Vannest, New Britain, Conn.
[73] Assignee: Textron Inc., Providence, R.I.
[22] Filed: May 14, 1970
[21] Appl. No.: 48,734

Related U.S. Application Data

[62] Division of Ser. No. 778,684, Nov. 25, 1968, Pat. No. 3,628,839.

[52] U.S. Cl. ..........................................29/148.4 C, 29/558
[51] Int. Cl. ..............................B21d 53/12, B23p 13/04
[58] Field of Search................29/148.4 C, 148.4 R, DIG. 26, 29/558

[56] References Cited

UNITED STATES PATENTS 3,026,601  3/1962  Potter...............................29/148.4 C Primary Examiner—Thomas H. Eager
Attorney—Hopgood and Calimafde

[57] ABSTRACT

An economical machining method is described for manufacturing roller-bearing retainer rings wherein lubricating cavities are formed in the sides rimming the roller-element pockets, the roller pockets and lubrication concavities being conveniently machine-formed simultaneously with radially recessed roller supports.

10 Claims, 15 Drawing Figures

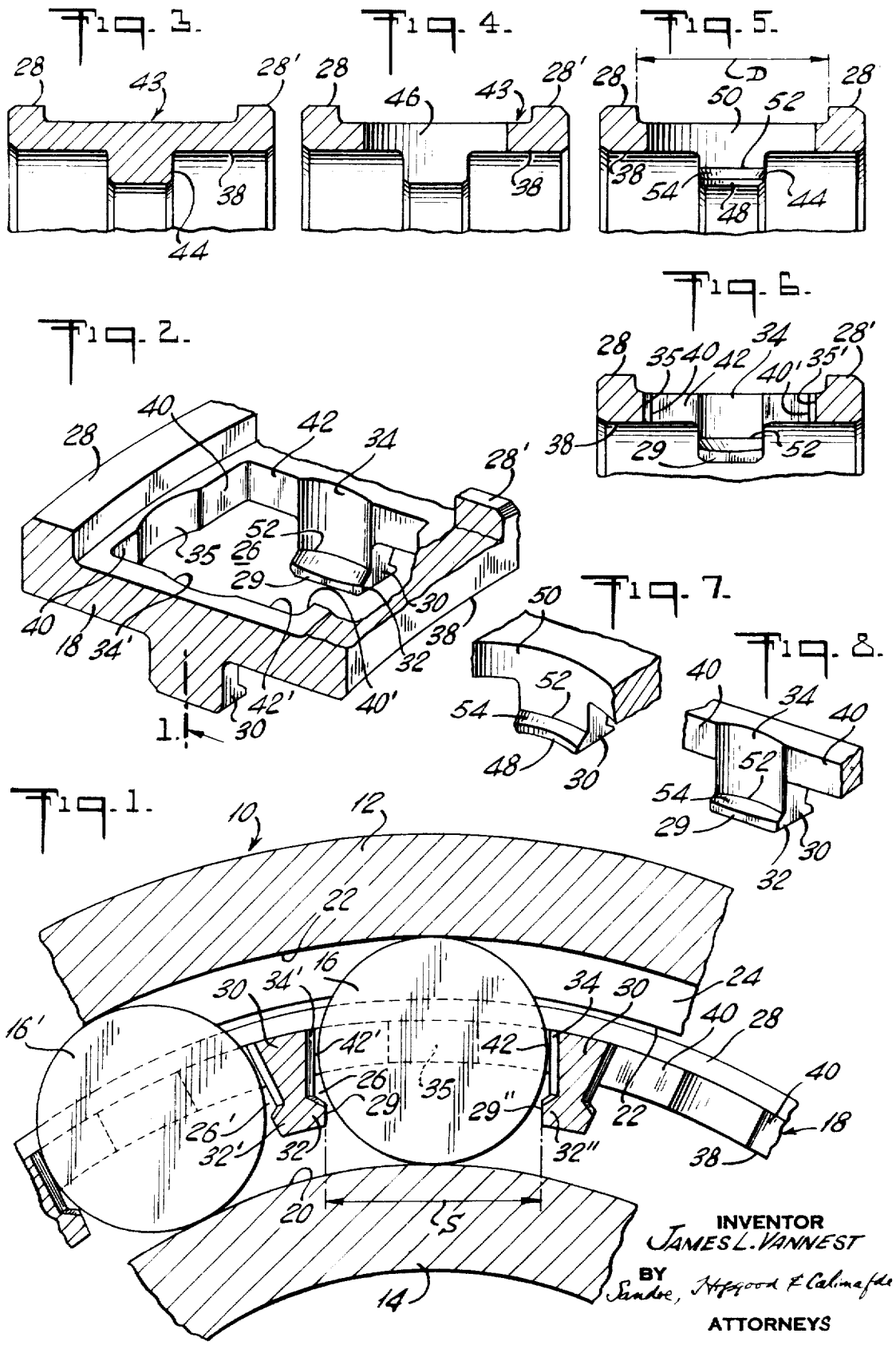

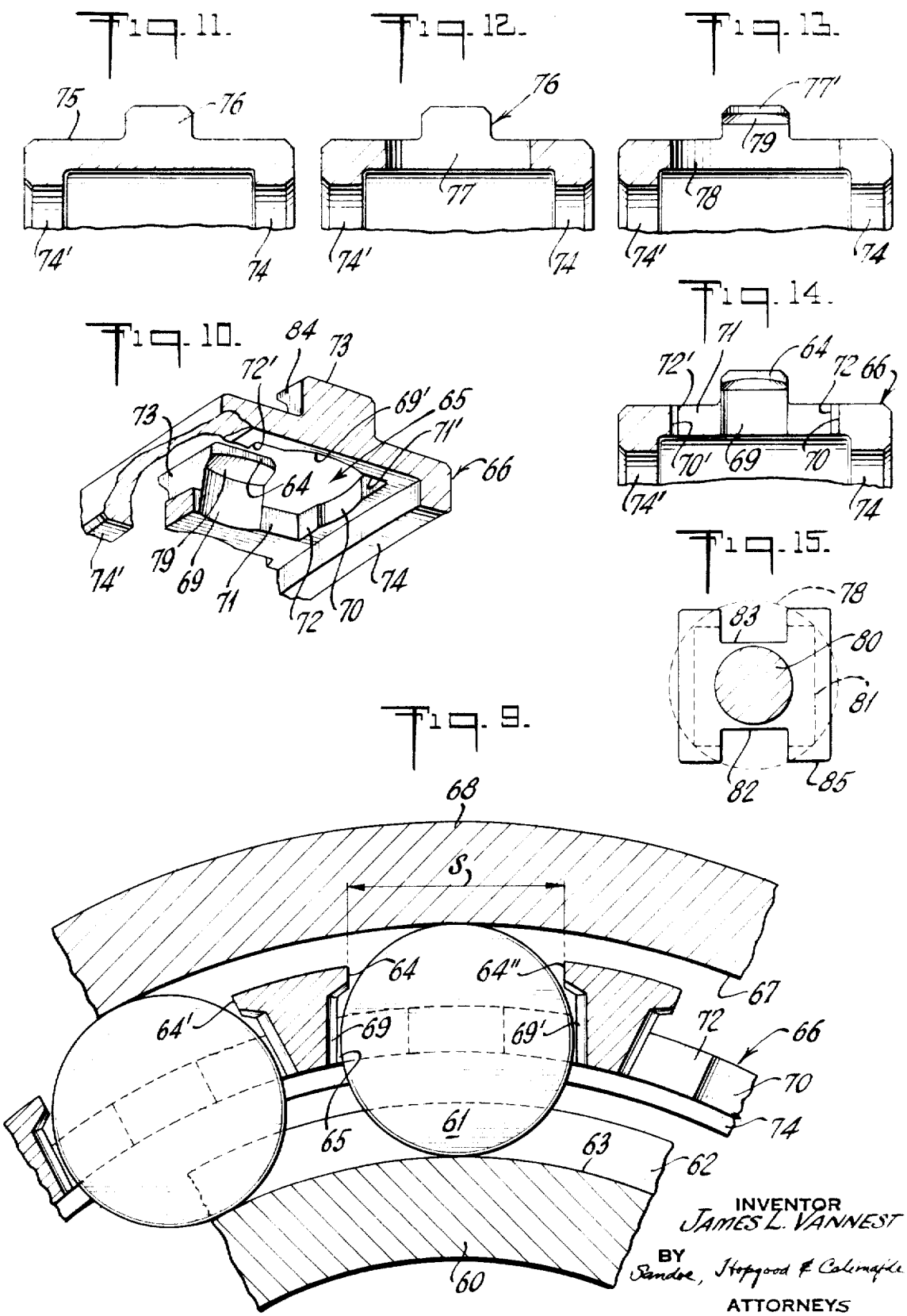

METHOD FOR MAKING A ROLLER BEARING RETAINER

This application is a division of my application Ser. No. 778,684, filed Nov. 25, 1968, due to issue on Dec. 21, 1971 as U.S. Pat. No. 3,628,839.

In the patents to Potter U.S. Pat. Nos. 3,027,206 and 3,026,601, a ball-bearing retainer ring and method of making same are described. In these patents, the retainer ring is provided with outwardly extending tabs which are, after insertion of balls in the ring pockets, bent over to radially retain bearing balls. As described in these patents, the ball pockets are first drilled and subsequently reamed out with a cherry reamer to form generally spherical seats in the inwardly directed partitions between the pockets to permit the balls to rest in generally spherical seats.

In the use of high-speed roller elements it is important that adequate lubricating oil be provided at the operating speeds of the bearing. Consequently, special provisions must be included in the retainer ring to assure that lubricating oil may freely pass from a radially inner side of the retainer ring to a radially outer side without depending upon the usual clearance between the roller and sides of the pocket in the retainer ring.

Furthermore, it is highly desirable that the retainer ring be well balanced to provide a smooth-running high-speed bearing. Deformation of portions of the retainer ring, such as the bending of tabs, introduces slight imbalances which are difficult to compensate for and reduce the operating life of the entire bearing.

It is an object of this invention to provide a simplified method of making a retainer ring of the character described.

This object is accomplished by my invention which is described in conjunction with the drawings wherein:

FIG. 1 is an enlarged fragmentary sectional view of an assembled roller bearing incorporating a retainer ring made by the method of the invention;

FIG. 2 is a fragmentary perspective view of a pocket in the retainer ring of FIG. 1;

FIG. 3 is a fragmentary cross-sectional view of a retainer-ring blank used in the invention, the section being taken in a plane which includes the axis of the ring;

FIGS. 4, 5, and 6 are similar cross-sectional views, respectively illustrating a first drilling step, a final drilling step, and a broaching step used in the formation of the retainer ring of FIG. 2;

FIGS. 7 and 8 are enlarged fragmentary perspective views of a portion of the pocket formation, respectively corresponding to the situations depicted in FIGS. 4 and 5;

FIG. 9 is a view similar to FIG. 1 to illustrate an alternative construction;

FIG. 10 is a fragmentary perspective view of a pocket in the retainer ring of FIG. 9;

FIGS. 11, 12, 13 and 14 are views similar to FIGS. 3, 4, 5 and 6, respectively, but for the construction of FIG. 9; and FIG. 15 is a simplified end view, partly in section, to illustrate a broach which may be used in the method of the invention.

Briefly stated, my invention contemplates forming rectangular pockets in a retainer ring for a roller bearing, at least two opposed faces of the rims of the pockets being provided with concavities for the carrying of lubricating oil. The formation of the pockets and the concavities may be carried out simultaneously with the formation of integral radially projecting roller-element supports which are locally yieldable, without permanent deformation, to assist in assembly of a bearing but which, in the ultimate bearing assembly, clear the rollers and are therefore not involved in bearing operation.

In FIG. 1 a portion of a roller bearing 10 is shown with an outer race ring 12, an inner race ring 14, anti-friction roller elements 16—16' and a roller retainer ring 18. The inner race ring 14 has an outer race surface 20 which is straight cylindrical. The outer race ring 12 is provided with a raceway 22 on its inner surface. This raceway 22 is recessed and is flanked by a pair of annular inwardly projecting flanges 24—24', one of which 24 is visible in the view of FIG. 1. The rollers such as 16—16' run along the race surfaces 20-22 and are retained in rectangular pockets 26—26' formed in the retainer ring 18. Plural rectangular pockets are uniformly distributed about the outer periphery of the ring 18.

The body of retainer ring 18 may pilot directly on flanges 24—24' or it may be formed with circumferential side rails, rims or flanges to pilot on the other bearing ring 14. In the form shown, retainer-piloting is on the outer race ring 12, using integral side rims or flanges; thus a lubricant-channeling, manifolding or reservoir function is achieved by the annular space between piloting rims.

The retainer ring 18 is thus provided with a pair of outwardly projecting annular side rails or rims 28—28' located at axial ends of the ring 18 opposite the annular lands of the outer race ring 12. One of the rims 28 is visible in the view of FIG. 1. The annular rims fit with radial clearance in co-planar concentric relationship with flanges 24—24' of the outer race ring 12 to pilot or centrally position the retainer ring 18.

A plurality of tabs 30, shown in section in FIG. 1, project radially inwardly. The tabs 30 terminate radially inwardly short of the race surface 20 of inner ring 14, and piloting at 24-28 assures that tabs 30 will clear race 20 during operation of the bearing. The tabs 30 are uniformly spaced at angular locations adjacent the pockets 26—26' and are located substantially midway between the axial ends of the ring 18. Each tab 30 has a pair of lips 32—32' respectively projecting under adjacent pockets 26—26'. Each pocket 26 is provided with a pair of lips 32—32'' which project toward each other across a pocket 26 to partially constrict the pocket opening and thus provide recessed support for the rollers during assembly of the bearing 10. For a given roller pocket 26, the opposed faces 29—29'' of these lips 32—32'' are spaced from one another by a distance which is slightly less than the diameter of a roller, so that rollers such as 16 may be inserted into the pocket 26 from the radially inner side of the retainer ring 18. A slight temporary resilient deformation of the tabs will occur to permit the passage of the roller, but the interference is so slight that there is neither injury to the roller surfaces nor permanent deformation of the tabs 30. Once inserted, the rollers are loosely retained with ample clearance with respect to lips 32—32''; the preassembly of rollers, retainer and outer ring 12 is unit-handling.

Each of the rectangular pockets 26 is further provided with concavities such as 34—34'. These concavities are formed in sides of the rectangular pocket and extend from the radially outer surface of the retainer ring to its radially inner surface 38. The concavities 34—34' are located substantially midway between the axial ends of the retainer ring and provide lubricating passages during operating of the bearing, serving to channel an ample and symmetrical supply of lubricant at the region of greatest bearing load.

In addition to the lubricating passages 34—34' for the load-sustaining bearing surfaces, I provide further lubricating passages 35—35' for the respective end faces of each roller. The passages 35—35' extend radially, for the central thickness of the retainer section, and all passages 34—34' and 35—35' for a given pocket 26 are afforded manifolding communication with the annular lubricant-accumulating region defined between shoulders or rims 28—28'. The manifolding action applies as between the lubricating passages of a given pocket (26) and also as between the lubricating passages of adjacent pockets (26—26'), for the annular extent of the retainer.

In making the retainer ring 18 of FIG. 1, a ring blank 43 is formed with a cross-section as in FIG. 3. This ring blank may be made from tubular stock which is machined to the desired shape, with the two annular rims or shoulders 28—28' located at axial ends of the ring and protruding radially outwardly. An inwardly projecting continuous annular rib 44 is formed substantially midway between the rims 28—28'. The rib 44 provides body material for later formation of the tabs 30 therefrom.

FIG. 4 illustrates a next step, wherein a plurality of pilot bores are drilled at circumferentially uniformly distributed and axially centered locations. In FIG. 4, the pilot bore 46 is formed by passing the drill radially inwardly entirely through the ring blank 43 so that the inwardly projecting rib 44 is severed at the angularly spaced pilot bore locations. A small arcuate edge portion of a severed rib, due to the drill operation described in connection with FIG. 4, is shown remaining at 48 in FIGS. 5 and 7.

After the required plurality of pilot bores 46 has been drilled in the ring blank 43, a radially inward final drilling step is performed, to define a counterbore 50 concentric with each of the bores 46. A drill is selected with a diameter that exceeds the length of a side of the rectangular roller pocket 26, but which at the same time is preferably less than the total span D between adjacent inner walls of rims or shoulders 28—28' (FIG. 5). The depth of counterbore 50 is carefully controlled to terminate at 52, radially inwardly of the locus of roller centers and of the inner surface or rib 44, but short of the innermost extreme of the tabs 30. The tip of the drill has the normal conical shape and therefore forms the surface 54 at the inner limit of the counterbore 50.

It will be understood that the two drilling steps may be performed in a single operation, using a single drill having the required two-step profile to generate the described bore and counterbore surfaces.

After final drilling, a two-step broach is applied to cut rectangular swaths on the axis of each pocket-bore axis. The larger step of the broach has opposed pairs of rectilinear ides 40—40' and 42—42', respectively spanning, with small clearance, length and diameter dimensions of the rollers, but slightly smaller than the diameter of the final-drill bore 50. The smaller step of the broach is defined by a pair of sides with the reduced spacing S, to generate the parallel lip surfaces 29—29''. Thus, for the case of a square-shaped pocket 26, the two-step broach generates square cuts; its concentric radially inward application to ring 18 at each bore 50 leaves equally-sized concavities or lubricant passages 34—34'—35—35' at the mid-portion of each of the sides 40—40'-42—42'.

The two-step broach is carefully applied to the bore 50, and the depth of cut of the larger step is terminated in the vicinity of the bottom 52 of the final bore 50. The smaller step is straight-sided and cuts away a portion of the lip 32 to form the parallel opposed surfaces 29—29''. FIG. 8, which is from the perspective aspect of FIG. 7, illustrates that both the shape of the tab 30 and the rectangular pocket contour are defined by a single limited inward stroke of the two-step broach.

In situations where the roller is axially longer than its diameter, the broach will be rectangular and not square. In such case, the final-drill diameter is selected to be slightly larger than the diameter of the roller but smaller than the axial length of the roller. Lubrication is then assured through the concavities formed along the pocket side walls 42—42' which guide the cylindrical surfaces of the rollers 16.

FIGS. 9 to 14 illustrate a modification in which a preassembly is formed with an inner-race ring 60. The preassembly involves rollers, laterally retained between outwardly extending side flanges 62 which border the grooved raceway 63, the rollers being loosely retained by projecting lips 64—64'' at each opening (such as the pocket opening 65) in a retainer 66. This preassembly is unit-handling, for later inserted assembly in the race bore 67 of an outer bearing member or ring 68.

As with the form of FIGS. 1 to 8, the pocket openings 65 of the form of FIGS. 9 to 14 may be rectangular, in conformance with the longitudinal sectional profile of the rollers 61, and like lubricant cusps 69—69' and 70—70' may be formed in opposed pairs of sides 71—71' and 72—72' of each pocket opening. Integral tabs 73 project radially outwardly to position oppositely directed pairs of lips 64—64', for roller retention during preassembly and assembly. Side rims or flanges 74—74' are integral with the retainer ring 66 and project radially for free piloting clearance relation with the inner ring flanges 62. The span S characterizes the spacing between opposed lips 64—64'' at any given pocket opening, such span being slightly less than the roller diameter, to permit transient resilient (but not permanent) deformation of the projections or tabs 73 during roller assembly, as a radially inward snap-in of each roller 61.

FIGS. 11 to 14 illustrate successive steps in a method of making the retainer 66, commencing in FIG. 11 with a ring blank having an annular body 75 with an integral and generally centrally located radially outward rib 76, between the side flanges or rims 74—74'. In a first drill step (FIG. 12), a reduced bore 77 is defined at successive radially directed axes which are uniformly spaced over the circumferential extent of ring 66. A small part 77' of this first bore remains at the projecting limit of rib 76 when the second or counterboring step is performed (FIG. 13) to define the counterbore 78. If a radially outward drill is used to form counterbore 78, its conical tip will define a small conical transition 79 at the counterbore limit, adjacent the small projecting remainder 77' of bore 77. Thereafter, a two-stage radial broaching operation is used to define (a) the rectangular roller-locating corners of the pocket opening and (b) the slabbed-off flat faces of each pair of opposed retaining lips 64—64'', all as identified in FIG. 14.

FIG. 15 further illustrates the broaching operation, in terms of tool considerations. The broach of FIG. 15 will be understood to be elongated and to have a stem 80 for manipulating purposes. To form the desired rectangular profile the initial broaching teeth are suggested by dashed outline 81, for containment within the circular contour of the counterbore 78, also suggested by dashed outline. Opposed piloting grooves 82–83 extend as channels along the effective broaching length, for guided retention along side walls (as at 84, FIG. 10) of the tabs 73. The broach tooth profile enlarges with succeeding teeth, to a final-cut profile 85, shown in solid lines in FIG. 15. The broach cut for any single pocket may be performed by a succession of progressively larger tools to cover the contour-cut range between 81 and 85, in which event the second-stage cut at 64—64'' may be achieved by suitable teeth incorporated at the final-cutting end of the last such tool. On the other hand, for a retainer which is to incorporate an even number of roller pockets 65, a single elongated broach tool (as described for FIG. 15) may be employed in each cutting stroke to define the respective rectangular contours of each pair of diametrically opposed pockets; in such event, all pockets are defined by a number of broach strokes which is half the number of pockets, and the final-broach slab-off at 64—64'' is a secondary operation.

The retainer rings as thus described are entirely machined to a finished state and exhibit excellent balance, whether the ring is of the FIG. 1 or FIG. 9 variety. The easily-controllable steps required to provide such a high-quality retainer ring permit the manufacture of long-lasting, economical high-speed roller bearings. No permanent deformation is required of any parts, in order to produce a unit-handling assembly of rollers, retainer and outer ring.

In addition, it is noted that upon final-broaching to form surfaces 29—29'' (FIG. 1) or 64—64'' (FIG. 9), there are inherently produced, at the axial extremes of intersection of each of these surfaces (29; 64) with the adjacent conical surface (54; 79), two axially spaced points of support for an inserted roll. Thus, for each roller pocket, there are four points of roller support, at such generous axial spacing as to provide roller-axis stability and to thereby avoid angularly cocking rolls prior to assembly to the inner ring or shaft 14, or to the outer member or ring 68, as the case may be.

While the invention has been described in considerable detail, it is to be understood that various modifications and changes may be made within the scope of the invention, as defined by the claims.

What is claimed is:

1. A method of making an annular retainer ring for a roller bearing comprising forming a ring blank having a radially projecting rib between the axial ends of the ring blank, drilling a plurality of angularly spaced holes radially through the blank and toward the rib, with a drill, and terminating the drilling step short of the projecting limit of the rib to form tabs with lips projecting to partially constrict the drilled holes, broaching the drilled holes radially toward the tabs with a rectangularly-shaped broach having an effective section (a) with a pair of opposite sides of lesser length and (b) with greater diagonal extent than the diameter of the drill, to form rectangular roller pockets having sides provided with concavities for the carrying of lubrication material, and controlling the cutting displacement by the broach to leave lips projecting to constrict the pockets to provide locating support for roller elements mounted in the pockets.

2. The method as recited in claim 1, wherein said drilling step further comprises drilling said plurality of spaced holes with a drill having a conically-shaped tip.

3. The method as recited in claim 1, wherein said broaching step further comprises broaching the drilled holes with a two-stepped broach, the larger step being rectangularly shaped and the smaller step being provided with straight sides aligned to sever selected portions of the lips.

4. The method as recited in claim 1, wherein the broach is square-shaped to provide a concavity in each of the sides rimming the roller-receiving pocket.

5. The method as recited in claim 4, wherein said broach is applied substantially concentric with said drilled holes to provide substantially equally sized and symmetrically located concavities.

6. The method of making a roller-bearing retainer ring, comprising: forming a ring blank, drilling a plurality of like angularly spaced radial bores through said blank, and radially broaching the drilled bores with a rectangularly-shaped broach having (a) a pair of sides of length less than the drilled-bore diameter and (b) a diagonal dimension which exceeds the drilled-bore diameter, the broach axis being coincident with the drilled-bore axis, whereby like arcuate lubricant passages are defined at opposed faces of otherwise rectangular roller-locating pocket openings.

7. The method of claim 1, wherein said rib is on the outside of said ring blank and projects radially outwardly, and wherein said drilling stop is in the radially outward direction.

8. The method of claim 1, wherein said rib is on the inside of said ring blank and projects radially inwardly, and wherein said drilling stop is in the radially inward direction.

9. The method of claim 1, wherein said rib is on the outside of said ring blank and projects radially outwardly, and wherein said drilling step is in the radially outward direction.

10. The method of claim 1, wherein said rib is on the inside of said ring blank and projects radially inwardly, and wherein said drilling step is in the radially inward direction.

* * * * *